US009380007B2

(12) United States Patent
Zecharia et al.

(10) Patent No.: US 9,380,007 B2
(45) Date of Patent: Jun. 28, 2016

(54) METHOD, APPARATUS AND SYSTEM FOR PACKET REASSEMBLY AND REORDERING

(71) Applicant: Huawei Technologies Co., LTD., Shenzhen (CN)

(72) Inventors: Rami Zecharia, Adanim (IL); Alex Umansky, Hadera (IL); Yan Wang, Shenzhen (CN)

(73) Assignee: Huawei Technologies Co., Ltd., Shenshen (CN)

( * ) Notice: Subject to any disclaimer, the term of this patent is extended or adjusted under 35 U.S.C. 154(b) by 106 days.

(21) Appl. No.: 14/182,106

(22) Filed: Feb. 17, 2014

(65) Prior Publication Data

US 2014/0160935 A1   Jun. 12, 2014

Related U.S. Application Data

(63) Continuation of application No. PCT/CN2011/078504, filed on Aug. 17, 2011.

(51) Int. Cl.
| | |
|---|---|
| *H04J 3/24* | (2006.01) |
| *H04L 12/861* | (2013.01) |
| *H04L 12/801* | (2013.01) |
| *H04L 12/18* | (2006.01) |
| *H04L 12/851* | (2013.01) |
| *H04L 12/863* | (2013.01) |

(52) U.S. Cl.
CPC .......... *H04L 49/9057* (2013.01); *H04L 12/185* (2013.01); *H04L 47/2408* (2013.01); *H04L 47/34* (2013.01); *H04L 47/624* (2013.01)

(58) Field of Classification Search
USPC ............................ 370/235, 394, 395.1–395.6
See application file for complete search history.

(56) References Cited

U.S. PATENT DOCUMENTS

| | | | | |
|---|---|---|---|---|
| 6,148,001 | A  * | 11/2000 | Soirinsuo et al. | 370/395.4 |
| 6,741,552 | B1 * | 5/2004 | McCrosky et al. | 370/218 |
| 6,778,537 | B1 * | 8/2004 | Ishibashi | 370/395.62 |
| 6,781,992 | B1 | 8/2004 | Rana et al. | |
| 6,977,930 | B1 * | 12/2005 | Epps et al. | 370/392 |
| 6,980,552 | B1 * | 12/2005 | Belz et al. | 370/392 |
| 7,085,274 | B1 * | 8/2006 | Rahim et al. | 370/394 |
| 7,107,359 | B1 * | 9/2006 | Burton et al. | 709/250 |
| 7,124,231 | B1 * | 10/2006 | Garner et al. | 710/310 |

(Continued)

FOREIGN PATENT DOCUMENTS

| | | |
|---|---|---|
| CN | 101795236 A | 8/2010 |
| CN | 101932006 A | 12/2010 |

(Continued)

*Primary Examiner* — Edan Orgad
*Assistant Examiner* — Sithu Ko
(74) *Attorney, Agent, or Firm* — Brinks Gilson & Lione

(57) ABSTRACT

A method for packet reassembly and reordering, comprising: receiving a cell sent by a source port, wherein the cell carries a Source Identification (SID), a packet sequence number and a cell sequence number; preprocessing the received cell according to the SID to determine whether the cell shall be inserted into a packet reassembly database; ordering cells in the packet reassembly database according to the packet sequence number to obtain a correctly ordered packet; if the correctly ordered packet is a complete packet, ordering the cells of the correctly ordered packet according to the cell sequence number to obtain correctly ordered cells; and performing a packet reassembly for the correctly ordered cells. Correspondingly, a network device and a communication system are provided.

17 Claims, 7 Drawing Sheets

(56) References Cited

U.S. PATENT DOCUMENTS

| | | | |
|---|---|---|---|
| 7,167,476 B1* | 1/2007 | Kritayakirana et al. | 370/394 |
| 7,295,574 B1* | 11/2007 | Parruck et al. | 370/474 |
| 7,342,887 B1* | 3/2008 | Sindhu et al. | 370/235 |
| 7,486,678 B1* | 2/2009 | Devanagondi et al. | 370/394 |
| 7,873,693 B1* | 1/2011 | Mehrotra et al. | 709/203 |
| 2002/0099900 A1 | 7/2002 | Kawarai et al. | |
| 2005/0100035 A1* | 5/2005 | Chiou et al. | 370/412 |
| 2006/0104271 A1* | 5/2006 | Samudra | 370/389 |
| 2007/0248086 A1* | 10/2007 | Petersen | 370/389 |
| 2008/0031252 A1* | 2/2008 | Oskouy et al. | 370/392 |
| 2008/0279195 A1* | 11/2008 | Okuno | 370/395.6 |
| 2009/0252168 A1* | 10/2009 | Okuno et al. | 370/395.1 |
| 2010/0157994 A1* | 6/2010 | Beisel et al. | 370/355 |
| 2011/0267942 A1* | 11/2011 | Aybay et al. | 370/230 |
| 2012/0140686 A1 | 6/2012 | Wen | |
| 2012/0253780 A1* | 10/2012 | Talla et al. | 703/23 |

FOREIGN PATENT DOCUMENTS

| | | |
|---|---|---|
| EP | 0697777 A2 | 2/1996 |
| JP | 2002-208938 A | 7/2002 |
| WO | WO 97/48250 A1 | 12/1997 |
| WO | WO 0243329 A1 * | 5/2002 |

* cited by examiner

METHOD, APPARATUS AND SYSTEM FOR PACKET REASSEMBLY AND REORDERING

CROSS-REFERENCE TO RELATED APPLICATIONS

This application is a continuation of International Application No. PCT/CN2011/078504, filed on Aug. 17, 2011, which is hereby incorporated by reference in its entirety.

FIELD OF THE INVENTION

The invention relates to the field of communication technology, and particularly, to a method, an apparatus and a system for packet reassembly and reordering.

BACKGROUND OF THE INVENTION

The data communication equipment is composed of a plurality of line cards and fabric switch boards, wherein the line cards and the fabric switch boards are connected to each other crosswise and vertically. After receiving from an upstream device the packets with various lengths going to different destinations, the line card at the input end transmits the packets to a Packet Processor (PP), which searches for a routing table according to the packet destinations so as to determine an output end, and transmits the packets to a Traffic Management (TM). After being shaped by the TM, the packets are split into a plurality of cells with a fixed size at a Fabric Switch Interface (FI). The cells are continuously sent to the fabric switch. The fabric switch selects a path for each cell independently and transmits the cells to a destination port.

Since different cells may be transmitted through different paths of the fabric switch, the cells arriving at the destination port may be disordered (i.e., the cells belonging to a same packet do not arrive sequentially in their positional orders in the packet), thus the disordered cells need to be reordered (resequence) and the cells belonging to the same packet shall be reassembled into a complete packet. Next, the packets sent by a same source port are arranged in their sending sequences at the source port, and finally sent to a downstream device from the output port. In which, the series of operations, i.e., reassembling the cells of the same packet into a complete packet, arranging the packets sent by the same source port in their sending sequences at the source port, etc. are generally called as packet reassembly and reordering. In the prior art, the packets of various sources are usually reassembled and reordered at the destination port using the time scales. This method has a high requirement for the time scale synchronization. But when there are many sources, it is difficult to achieve very accurate time scale synchronization, thus this method is not suitable for equipment with high performance. However, if the packets are simply reordered based on the sources at the destination port without using the time scales, a lot of memories and control resources will be wasted.

SUMMARY OF THE INVENTION

The embodiments of the present invention provide a method, an apparatus and a system for packet reassembly and reordering, which are suitable for equipments with high performance while occupying fewer memories and control resources.

A method for packet reassembly and reordering, comprising:

receiving a cell sent by a source port, wherein the cell carries a Source Identification (SID), a packet sequence number and a cell sequence number;

preprocessing the received cell according to the SID to determine whether the cell shall be inserted into a packet reassembly database;

ordering cells in the packet reassembly database according to the packet sequence number to obtain a correctly ordered packet;

if the correctly ordered packet is a complete packet, ordering the cells of the correctly ordered packet according to the cell sequence number to obtain correctly ordered cells; and performing a packet reassembly on the correctly ordered cells.

A network device, comprising:

a receiving unit configured to receive a cell sent by a source port, wherein the cell carries a Source Identification (SID), a packet sequence number and a cell sequence number;

a preprocessing unit configured to preprocess the cell received by the receiving unit according to the SID to determine whether the cell shall be inserted into a packet reassembly database;

a packet ordering unit configured to order the cells in the packet reassembly database according to the packet sequence number to obtain the correctly ordered packet;

a cell ordering unit configured to, if the packet is determined as a complete packet, order the cells of the correctly ordered packet according to the cell sequence number, so as to acquire the correctly ordered cells; and a reassembling unit configured to perform a packet reassembly on the correctly ordered cells.

A communication system, comprising a source port device and any network device provided by the embodiments of the present invention;

the source port device is configured to send a cell to the network device, wherein the cell carries a Source Identification (SID), a packet sequence number and a cell sequence number.

The embodiments of the present invention preprocess the received cell according to the SID, so as to determine whether the received cell shall be inserted into the packet reassembly database, then directly order the cells in the database according to the packet sequence number and the cell sequence number of the cell, and finally achieve the packet reassembly. Since the solution can directly reorder and reassemble the packets according to the source, it is suitable for equipments with high performance as compared with the prior art that reorders and reassembles the packets based on the time scale synchronization. In addition, since the solution can control and mange the received cell (i.e., the packet waiting to be reassembled), the utilization ratio of resource is high, and less memories and control resources are occupied.

BRIEF DESCRIPTION OF THE DRAWINGS

In order to more clearly describe the technical solutions of the embodiments of the present invention, the drawings to be used in the descriptions of the embodiments are briefly introduced as follows. Obviously, the following drawings just illustrate some embodiments of the present invention, and a person skilled in the art can obtain other drawings from these drawings without paying any creative effort.

DETAILED DESCRIPTION OF THE PREFERRED EMBODIMENTS

The technical solutions in the embodiments of the present invention will be clearly and completely described as follows with reference to the drawings in the embodiments of the present invention. Apparently, the described embodiments are just a part of embodiments of the present invention rather than all the embodiments. Based on the embodiments of the present invention, any other embodiment obtained by a person skilled in the art without paying a creative effort shall fall within the protection scope of the present invention.

The embodiments of the present invention provide a method, an apparatus and a system for packet reassembly and reordering that are described as follows, respectively.

Embodiment 1

This embodiment will be described in the perspective of a network device serving as the destination port.

A method for packet reassembly and reordering, including: receiving a cell sent by a source port, wherein the cell carries a Source Identification (SID), a packet sequence number and a cell sequence number; preprocessing the received cell according to the SID to determine whether the cell shall be inserted into a packet reassembly database; ordering cells in the packet reassembly database according to the packet sequence number to obtain a correctly ordered packet; if the correctly ordered packet is a complete packet, ordering the cells of the correctly ordered packet according to the cell sequence number to obtain correctly ordered cells; and performing a packet reassembly for the correctly ordered cells.

Figure 1:
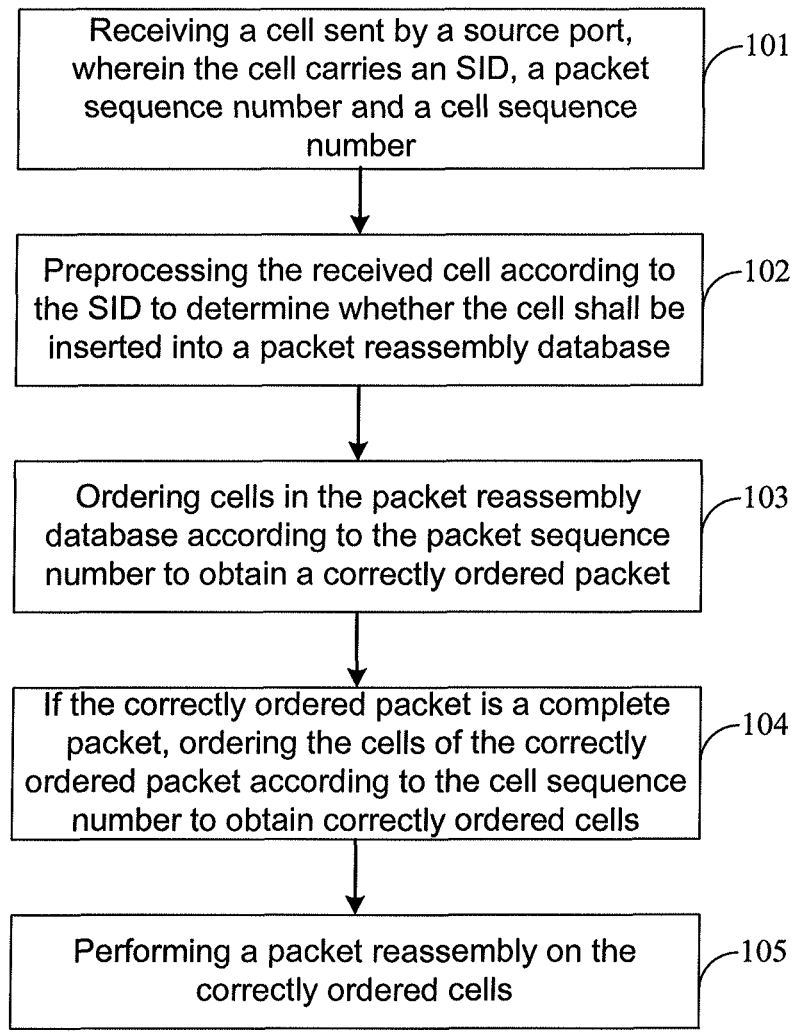
FIG. 1 is a flowchart of a method for packet reassembly and reordering provided by Embodiment 1 of the present invention.

Referring to FIG. 1, the concrete flow may be as follows:

101: Receiving a cell sent by a source port, wherein the cell carries an SID, a packet sequence number and a cell sequence number:

The SID is configured to identify the source and class of the cell, and a source port from which the cell comes can be acquired according to the SID. The SID may be classified into a unicast SID which is a set of source port numbers and Classes of Service (CoS) of a packet, i.e., {source port number, CoS of a packet}, and a multi-cast SID which is a set of source port numbers, CoS and Multicast Group IDs (MGIDs), i.e., {source port number, CoS of a packet, MGID}, wherein MGID is assigned to a multicast packet by the PP of the source line card.

The packet sequence number is configured to identity the position of the packet in the data stream.

The cell sequence number is configured to identify the position of the cell in the packet.

For example, a cell sent by the source port specifically may be received through the fabric switch. In which, the source port slices the packet to obtain the cell, and assigns a packet sequence number and a cell sequence number to the cell. For example, two packets of the same destination port are sliced into cells, wherein the first packet is sliced into three cells with sequence numbers (1, 1), (1, 2) and (1, 3), respectively, while the second packet is sliced into four cells with sequence numbers (2, 1), (2, 2), (2, 3) and (2, 4), respectively, wherein the first number in the parentheses is the packet sequence number, and the second number in the parentheses is the cell sequence number.

102: Preprocessing the received cell according to the SID to determine whether the cell shall be inserted into a packet reassembly database.

In which, the cell may include cell data and cell information. In order to save the resources, just the cell information is operated during the ordering process, and only when a packet reassembly is performed, corresponding cell data is extracted for the reassembly according to the cell information. For example, the details may be as follows:

(1) after stamping the received cell with a local time stamp of the arrival, storing cell data of the cell in a load memory according to the SID, and configuring corresponding load memory index value, based on which corresponding cell data can be acquired from the load memory;

(2) inserting the cell information of the cell into an Input FIFO (IF) queue, wherein the cell information may include some cell-related information such as the SID, the local time stamp, the load memory index value, the packet sequence number and the cell sequence number of the cell;

wherein, the local time stamp is mainly used to judge a time of the cell waiting in the local, and the cell will be discarded if the waiting time is too long; please refer to the previous descriptions for the functions of the SID, the load memory index value, the packet sequence number and the cell sequence number, and herein are omitted;

(3) processing the cell information in the IF queue according to the SID, the packet sequence number and the state of the Postponed FIFO (PF) queue, to determine whether the cell information shall be inserted into the cell reassembly database:

if the depth of each PF queue is less than a preset threshold, determining whether the cell corresponding to head cell information of the IF queue shall be processed; if yes, popping the head cell information of the IF queue; if not, pushing the head cell information of the IF queue into one of the PF queues (multiple PF queues may be constructed to buffer cells of different waiting time), and popping head cell information of the fullest PF queue;

judging whether the cell corresponding to the popped head cell information of the IF queue or the cell corresponding to the popped head cell information of the PF queue is time out; if yes, recycling the cell corresponding to the cell information and the packet to which the cell belongs; if not, inserting the cell information into the packet reassembly database, when the packet sequence number of the cell is less than the maximum packet sequence number of the same source in the packet reassembly database; and inserting the cell information into one of the PF queues, when the packet sequence number of the cell is larger than the maximum open packet sequence number of the same source in the packet reassembly database.

On the contrary, if the depth of a certain PF queue is larger than the preset threshold, determining whether the cell corresponding to the head cell information of the overflow PF queue shall be processed; if not, recycling the cell corresponding to the head cell information of the overflow PF queue (i.e., the PF queue with a depth larger than the preset threshold, e.g., the PF queue is full), then performing the step of determining whether the cell corresponding to the head cell information in the IF queue shall be processed (see the previous description); and if yes, performing the step of pushing the head cell information of the IF queue into one of the PF queues, and popping the head cell information of the fullest PF queue.

In which, the PF queue is mainly used to store cells arriving at the destination port too early, that is to say, if a cell arrives at the destination port too early, it will be put into the PF queue rather than being currently processed, then extracted from the PF queue just at proper time and inserted into the packet reassembly database.

In which, whether the cell shall be processed may be determined according to the amount of the open packets (i.e., the packets which are waiting to be processed) in the queue, namely, by deciding whether a difference between the minimum packet sequence number of the packet currently being processed and the packet sequence number of the current cell is less than a preset value; if being less than the preset value, it means that the cell shall be processed, and then the current cell can be processed; otherwise it means that the cell shall not be processed, and then the cell may be delayed, i.e., being put into the PF queue. For example, if the maximum amount of the open packets in the queue is 16, and the minimum packet sequence number of the packet currently being processed is 1024, cells of any packet with the packet sequence number less than 1024 shall be discarded directly, while cells of any packet with the packet sequence number larger than or equal to 1024 and less than or equal to "1024+16" shall be processed. For example, when it is further determined that the cell is not time out and the packet sequence number of the cell is less than the maximum packet sequence number of the same source in the packet reassembly database, the cell will be inserted into the packet reassembly database; while the cell of any packet with the sequence number larger than "1024+16" shall be buffered, i.e., being inserted into the PF queue. Namely, the step "processing the cell information in the IF queue according to the SID, the packet sequence number and the state of the Postponed FIFO (PF) queue, to determine whether the cell information shall be inserted into the cell reassembly database" specifically may include:

if the depth of each PF queue is less than the preset threshold, determining whether a difference between the packet sequence number of the cell corresponding to the head cell information of the IF queue and the minimum packet sequence number of the packet currently being processed is less than a fourth threshold; if yes, popping the head cell information of the IF queue; if not, pushing the head cell information of the IF queue into one of the PF queues, and popping the head cell information of the fullest PF queue; judging whether the cell corresponding to the popped head cell information of the IF queue or the cell corresponding to the popped head cell information of the PF queue is time out; if being time out, recycling the cell corresponding to the cell information and the packet to which the cell belongs; if not being time out, inserting the cell information into the packet reassembly database, when the packet sequence number of the cell is less than the maximum open packet sequence number of the same source in the packet reassembly database; and inserting the cell information into one of the PF queues, when the packet sequence number of the cell is larger than the maximum open packet sequence number of the same source in the packet reassembly database.

If the depth of a certain PF queue is larger than the preset threshold, determining whether a difference between the packet sequence number of the cell corresponding to the head cell information of the overflow PF queue and the minimum packet sequence number of the packet currently being processed is less than a fifth threshold; if yes, recycling the cell corresponding to the head cell information of the overflow PF queue, then performing the step of determining whether the difference between the packet sequence number of the cell corresponding to the head cell information of the IF queue and the minimum packet sequence number of the packet currently being processed is less than the fourth threshold; and if not, performing the step of pushing the head cell information of the IF queue into one of the PF queues and popping the head cell information of the fullest PF queue.

In which, the fourth and fifth thresholds may be set according to the requirement of the practical application.

Either the unicast or the multicast may include many packet ordering queues each having several packets waiting to be reassembled and reordered (those packets waiting to be reassembled and reordered are also open packets). In which, the unicast may classify the packet ordering queues according to the Class of Service (CoS) of a packet and Source Identification (SID), i.e., cells of different CoSs of a packet and SIDs shall be put in different packet ordering queues. The multicast may classify the packet ordering queues according to the Class of Service (CoS) of a packet, Source Identification (SID) and Multicast Group ID (MGID). In which, each packet ordering queue has a packet descriptor array (i.e., a pre-allocated memory) serving as data to accommodate the packets to be ordered. Each entry in the packet descriptor array is actually a pointer that points to a cell descriptor belonging to the packet, while the cell descriptor also has a pointer that points to the next cell. Thus all the cells belonging to one packet constitute a linked list, and a transverse may be started from the first pointer in the packet array to all the cells. In which, the size of the packet descriptor array (i.e., the amount of the open packets that can be accommodated) is dynamically adjustable. For example, several packet descriptor arrays of different sizes may be pre-allocated. If the number of the open packets of a ordering queue increases and leads to an overflow of the packet descriptor array, a larger packet descriptor array may be employed to replace the original smaller packet descriptor array:

For the unicast, the packet reassembly database may include the Source Descriptor Memory (SDM) and the Source Queue Memory (SQM), wherein the SDM is configured to store source descriptors and take the CoS of a packet and the source port number as the index, i.e., employ {CoS of a packet, source port number} as the index; while the SQM is configured to store source queues corresponding to the source descriptors, and the SQM includes a pointer that points to the Reorder-Packet-Array-Buffer, which stores the packet descriptors of the cells waiting to be ordered, each of the packet descriptors pointing to a cell descriptor of a latest received cell belonging to the packet.

In which, the Reorder-Packet-Array-Buffer may be constructed by a dynamic packet descriptor array, and it specifically may include N classes of memory blocks of different capacities, wherein N is a positive integer. For example, when N=3, three classes of memory blocks with the following capacities may be protected:

(32*X), (128*X) and (512*X), wherein X is the width of a packet descriptor.

For the multicast, the packet reassembly database may include the MGID descriptor memory and the MGID queue memory, wherein the MGID descriptor memory is configured to store MGID descriptors and take the CoS of a packet, the MGID and the source port number as the index, e.g., employ the hash value of {CoS of a packet, MGID, source port number} as the index, while the MGID queue memory is configured to store MGID queues corresponding to the MGID descriptors; the MGID queue memory may include a pointer that points to the Reorder-Packet-Array-Buffer, which stores the packet descriptors of the cells waiting to be ordered, each of the packet descriptors pointing to a cell descriptor of a latest received cell belonging to the packet.

In which, the Reorder-Packet-Array-Buffer is a dynamic packet descriptor array, including M classes of memory blocks of different capacities, wherein M is a positive integer, which is similar to the unicast, and herein is omitted.

Since the space represented by {CoS of a packet, MGID, source port number} is very large, it is very difficult to create a corresponding packet ordering queue for each index of {CoS of a packet, MGID, source port number}. As a result, in order to save the resources, the MGID descriptor memory and the MGID queue memory may be enabled to support the hash function, i.e., each process (e.g., IF queue, PF queue, complete queue, Reorder-Packet-Array-Buffer and cell ordering buffer) may access the MGID descriptor memory and the MGID queue memory through the hash function. In which, the hash function may be constructed as multiple hash buckets. The so called hash function is to map {CoS of a packet, MGID, source port number} to a smaller space. For example, the hash function may take {CoS of a packet, MGID, source port number} as an input to calculate an index value corresponding to one or more (i.e., multiple hash buckets) packet ordering queues.

The employment of the hash function may cause a resource conflict, and thus a Fully Associative Victim Table (FAVT) shall be maintained, so that when a resource conflict occurs, the cell in which the resource conflict occurs can be pushed into another MGID queue or discarded according to the preset FAVT.

In addition, when the information amount of the FAVT exceeds a preset first threshold, the present destination port may be activated to send control information to the multicast source, thereby reducing the amount of multicast data sent to the present destination port. In which, the first threshold may be set according to the requirement of the practical application.

For example, each hash entry includes two hash buckets (i.e., two packet hash ordering queues); (1, 2, 128), (7, 0, 256), (11, 3, 567), etc. are all mapped to 16, i.e., the result of the hash function is 16 when those combinations are taken as the inputs. The cells of (1, 2, 128) may use the first packet ordering queue, the cells of (7, 0, 256) may use the second packet ordering queue, while the cells of (11, 3, 567) can only be discarded when they arrive because each hash entry just has two packet ordering queues. Of course, if all the cells of (1, 2, 128) have been successfully reassembled and scheduled out of the ordering queue, the first packet ordering queue will be empty. At this time, the first packet ordering queue may be used when the cells of (11, 3, 567) arrive. The FAVT indicates which index values (SID, CoS, MGID) occupy the packet ordering queues, and it is dynamically maintained according to the current state.

103: Ordering cells in the packet reassembly database according to the packet sequence number to obtain a correctly ordered packet. For example, the details may be as follows:

Ordering the packet descriptors in the Reorder-Packet-Array-Buffer according to the packet sequence number, and putting cell information having the same packet sequence number in the packet reassembly database into a packet ordering queue corresponding to the packet descriptor; for example, if the sequence numbers in the cell information stored in the packet reassembly database are (1, 1), (2, 3), (1, 3), (2, 1), (2, 4), (1, 2) and (2, 2), respectively, wherein in the parentheses the first number is the packet sequence number and the second number is the cell sequence number, cases after the packet ordering may be as follows:

the first packet ordering queue: (1, 1), (1, 3), (1, 2);
the second packet ordering queue: (2, 3), (2, 1), (2, 4), (2, 2).

It can be seen that the packets have been correctly ordered at that time, but the cells in the packets are still in a state of being disordered.

104: If the correctly ordered packet is a complete packet, ordering the cells of the correctly ordered packet obtained in step 103 according to the cell sequence number to acquire the correctly ordered cells; wherein a complete packet means that the cells in the packet are received completely. For example, the details may be as follows:

if the packet is a complete packet, adding the packet descriptor of the complete packet into corresponding Complete-FIFO (CF) queue according to broadcast class of the cell and the CoS of a packet, inserting corresponding cell information into a cell ordering buffer (also referred to as cell reordering buffer, Complete Packets FIFO) according to the packet descriptor in the CF queue, and ordering the extracted cell information in the cell ordering buffer according to the cell sequence number. In which, the broadcast class of a cell may include unicast or multicast.

In order to improve the ordering efficiency, the cell ordering buffer shall ensure that enough free space is available during the cell ordering. Thus it may be set that corresponding cell information is inserted into the cell ordering buffer according to the packet descriptor in the complete queue, only when the free space of the cell ordering buffer is larger than a preset threshold, e.g., the actual data volume of the cell ordering buffer is less than ½ of the admissible data amount.

In which, ordering the extracted cell information in the cell ordering buffer according to the cell sequence number specifically may be as follows:

The cell ordering buffer maintains a read pointer that reads the ordered cells one by one so as to perform a packet reassembly, and a write pointer that always points to the start position of a packet currently undergoing a cell ordering. Thus an offset position of the inserted cell information may be calculated by adding the write pointer with the cell sequence number, and then the position of the inserted cell information in the packet (i.e., the correct position in the packet) is adjusted according to the offset position, so as to obtain the correctly ordered cell information.

105: performing a packet reassembly on the correctly ordered cells, for example, the details are as follows:

allocating reassembly resources to the packet to which the correctly ordered cell information belongs, reading the correctly ordered cell information in the cell ordering buffer one by one, acquiring corresponding cell data according to the read cell information, and performing a packet reassembly on the cell data using the allocated reassembly resources.

Wherein, in order to improve the efficiency, the packet to which the correctly ordered cell information belongs may be allocated with at least two reassembly resources. In order for resource saving, the reassembly resources are managed in a resource pool and allocated to each source only when necessary, i.e., when a reassembly is to be made. For example, after the cells in the ordering buffer are correctly ordered, an indication signal (e.g., FIFO_RDY signal) requesting packet reassembly may be sent to a packet reassembly mechanism, and the packet reassembly mechanism starts a packet reassembly of the cells in the ordering buffer after receiving the indication signal requesting packet reassembly.

Of course, when there are at least two cell ordering buffers, the packet reassembly mechanism may simultaneously receive multiple indication signals requesting packet reassembly. In that case, the packet reassembly mechanism may select the cell ordering buffer to perform a process according to the CoS of a packet. Namely at that time, performing a packet reassembly on the correctly ordered cells specifically may include:

selecting a cell ordering buffer according to the CoS of a packet, reading correctly ordered cell information in the selected cell ordering buffer one by one, and extracting cell data according to the read cell information to perform a packet reassembly.

Optionally, in order to save the resources, improve the efficiency and avoid wasting too much time in a certain packet, the time for packet reassembly may be monitored, and the packet is discarded when the packet reassembly is time out. For example, it may be judged whether a difference between the arrival time of the cell firstly arriving at the destination port in the packet (e.g., the arrival time may be stamped by a local timestamp) and the current time is larger than a preset second threshold; if yes, determining whether the packet reassembly is time out and discarding the packet; otherwise, determining that the packet reassembly is not time out, and continuing reassembling the packet.

In which, the reassembly overtime period may further include the estimated time for the fabric switch delay, which may be estimated according to the packet sequence number. For the details, please refer to the prior art, and herein are omitted. Next, if the packet is delayed too long in the fabric switch, it may be directly discarded rather than being discarded in case of waiting and being reassembly timeout, i.e., optionally, before reassembling the correctly ordered cells into a packet, the method may further include:

discarding the packet when it is determined that the estimated value of the fabric switch delay exceeds a preset third threshold.

In which, the second and third thresholds may be set according to the requirement of the practical application.

For example, the packet at the head of a certain packet ordering queue has a packet sequence number of 123 and there is a cell of not arriving in the packet (that is, the packet with the packet sequence number of 123). In that case, a subsequent packet such as the packet having a packet sequence number of 124, cannot be reassembled even if all the cells thereof have arrived, and it is only processed after the packet having the packet sequence number of 123 receiving all the cells or being discarded when the packet having the packet sequence number of 123 is waited to be time out. Since the waiting for being timeout usually needs a long period, when a certain cell having the packet sequence number of 123 has an especially long delay in the fabric switch, it is unnecessary to wait for the timeout of the packet having the packet sequence number of 123, but determine whether the estimated value of the fabric switch delay exceeds the preset third threshold. For example, if a cell of a packet having a packet sequence number of 256 in the ordering queue is received at this time, since the difference between 256 and 123 is larger than the third threshold (e.g., the third threshold is set as 100), it is unnecessary to wait for the timeout of the packet having the packet sequence number of 123, but directly discard the packet having the packet sequence number of 123.

Further to be noted, in order to improve the efficiency, the above reordering and reassembly process may be divided into multiple parallel reassembly and reordering engines to support the unicast or multicast data streams of different CoSs. In which, the CoS of a packet is corresponding to the packet priority.

This embodiment preprocesses the received cell according to the SID, so as to determine whether the received cell shall be inserted into the packet reassembly database, then directly orders the cells in the database according to the packet sequence number and the cell sequence number of the cell, and finally achieves the packet reassembly. Since the present solution can directly reorder and reassemble the packets according to the source, it is suitable for the equipments with high performance when compared with the prior art that reorders and reassembles the packets based on the time scale synchronization. In addition, since the present solution can control and mange the received cell (i.e., the packet waiting to be reassembled), the utilization ratio of resources is high, and less memories and control resources are occupied.

Embodiment 2

Hereinafter, the method described according to Embodiment 1 will be further described in details through the examples.

Figure 2A:
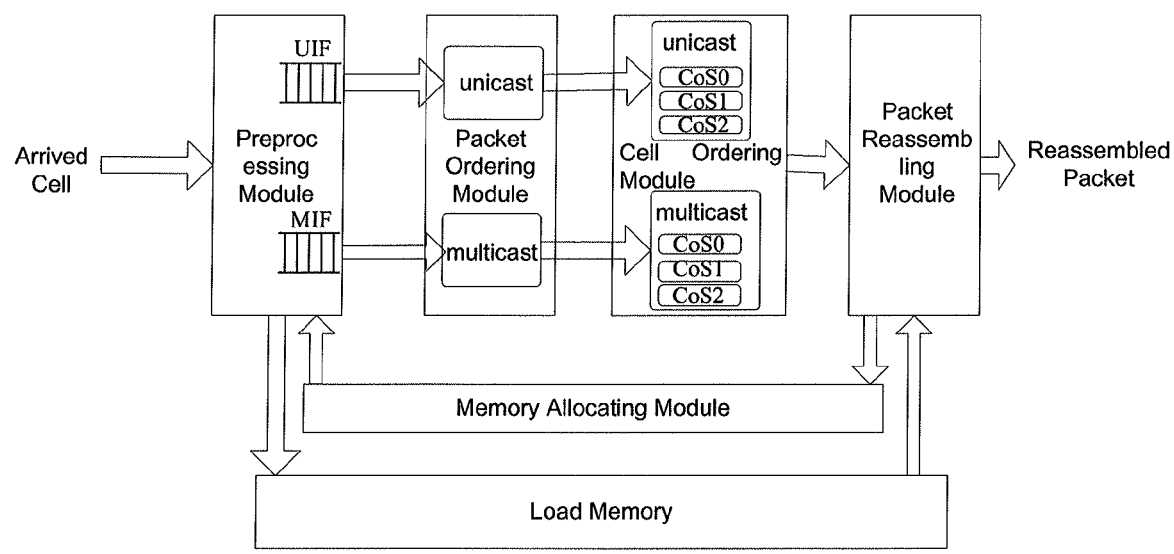
FIG. 2a is an architecture view of a process of packet reassembly and reordering provided by an embodiment of the present invention.

As illustrated in FIG. 2a, which is an architecture view of a process of packet reassembly and reordering, it mainly includes the following steps of:

Step 1: after a cell arrives at the destination port, a memory allocating module allocates a load memory to the received cell; a preprocessing module stores cell data of the cell into the load memory according to an SID, classifies cell information of the cell according to the SID of the cell, and stores the cell information into different IFs, respectively, according to the classes. For example, the cell information may be classified according to the broadcast class, and put into the Unicast Input FIFO (UIF) queue in case of being unitcast data, and put into the Multicast Input FIFO (MIF) queue in case of being multicast data, as illustrated in FIG. 2a. In which, the cell information may include some cell-related information such as the SID, the local time stamp, the load memory index value, the packet sequence number and the cell sequence number of a cell.

Figure 2B:
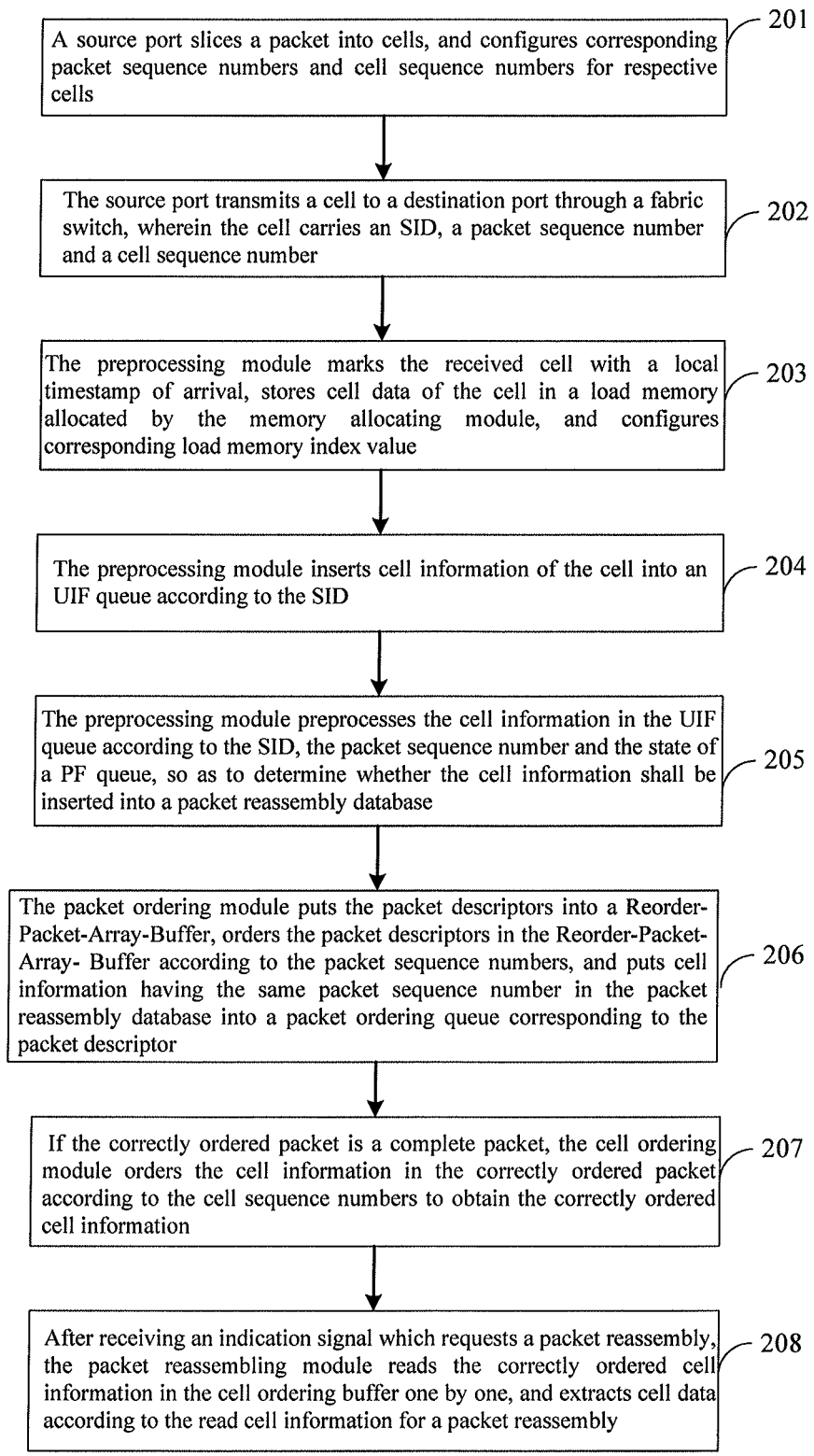
FIG. 2b is a flowchart of a method for packet reassembly and reordering provided by Embodiment 2 of the present invention.

The preprocessing module processes the cell information in the UIF queue and the MIF queue, respectively, according to the SID, the local timestamp and the state of the PF queue, to determine whether the cell information shall be inserted into the packet reassembly database of a packet ordering module. In which, the UIF queue and the MIF queue have corresponding processing modules in the packet reassembly database. For example, as illustrated in FIG. 2b, the UIF queue is corresponding to a "unicast" module in the packet reassembly database, and the MIF queue is corresponding to a "multicast" module in the packet reassembly database.

Step 2: packet ordering: the packet ordering module orders the packets in various sources, respectively, to obtain correctly ordered packets. For example, the packet descriptors in the Reorder-Packet-Array-Buffer may be ordered according to the packet sequence numbers, and the cells having the same packet sequence number in the packet reassembly database are put into the same packet ordering queue, referring to "CoS0, CoS1, CoS2" in FIG. 2a, wherein in the figure, CoS0, CoS1 and CoS2 represent packet ordering queues of different packet CoSs, respectively. In that case, the packets are correctly ordered, but the cells in the packets are still in a state of being disordered. That is to say, although CoS0, CoS1 and CoS2 are correctly ordered, the cells therein are still in a state of being disordered.

Step 3: cell ordering: a cell ordering module orders the cells in various complete packets, respectively, to obtain correctly ordered cells. In which, a complete packet indicates that all the cells therein have been received.

Step 4: packet reassembling: a packet reassembling module reassembles the correctly assembled cells into a complete packet. As illustrated in FIG. 2a, at that time, a memory allocation unit may allocate reassembly resources to the packet reassembling module. Next, the packet reassembling module reads the correctly ordered cell information in the cell ordering module one by one, extracts cell data from the load memory according to the read cell information, so as to reassemble a packet, and outputs reassembled packet, as illustrated in FIG. 2a.

The above reordering and reassembling process may be further divided into multiple parallel reassembly engines to support the unicast or multicast traffic of different CoSs.

To be noted, wherein, the design of the load memory shall satisfy the reading request from the packet reassembly module once a clock cycle. Since the packet reassembly process cannot be interrupted, the packet reassembling module does not require an FIFO queue capable of accommodating the whole packet, but an FIFO queue capable of accommodating just two to four cells. After a packet is started to be reassembled, the reassembly of the packet will be completed before the start of the reassembly of another packet.

In addition, the memory allocation unit is mainly used to allocate and recycle memories of the following classes: cell descriptor, packet descriptor array, MGID queue memory (for the multicast data). Each class of memory includes at least one FIFO queue for managing the allocable buffer. Each FIFO queue shall be able to allocate one buffer entry within one clock period.

After dequeuing a packet, the packet ordering module submits the packet to a packet recycling module, and the packet recycling module submits the cells in the packet one by one to a cell recycling module. When a packet is discarded, it will also be submitted to the packet recycling module, and the packet recycling module performs the same processing to discard the packet, meanwhile, all the packets having their packet sequence numbers smaller than that of the discarded packet and still being resident in the packet reassembly database will also be discarded.

Hereinafter, the unicast is taken as an example for a further description in details.

Referring to FIG. 2b, the concrete flow may include:

201: a source port slices a packet into cells, and allocates corresponding packet sequence numbers and cell sequence numbers for respective cells.

For example, at the source port, two packets going to the same destination port are sliced into cells, wherein the first packet is sliced into four cells with sequence numbers (1, 1), (1, 2), (1, 3) and (1, 4), respectively, while the second packet is sliced into five cells with sequence numbers (2, 1), (2, 2), (2, 3), (2, 4) and (2, 5), respectively. In the parentheses, the first number is the packet sequence number, and the second number is the cell sequence number.

At the source port, the packet sequence numbers are inserted into respective cells and maintained based on the data streams. For example, in case of unicast data, the packet sequence numbers are maintained according to the destination port and the CoS of a packet. In case of multicast data, the packet sequence numbers are maintained according to the MGID and the CoS of a packet.

202: the source port transmits a cell to a destination port through a fabric switch, wherein the cell carries an SID, a packet sequence number and a cell sequence number.

203: after the preprocessing module of the destination port has received the cells, it stamps the received cells with a local timestamp of arrival, stores cell data of the cells in a load memory allocated by the memory allocating module, and allocates corresponding load memory index value, based on which corresponding cell data can be acquired from the load memory.

204: the preprocessing module of the destination port inserts cell information of the cell into an UIF queue according to the SID, wherein, the cell information may include some cell-related information such as the SID, the local time stamp, the load memory index value, the packet sequence number and the cell sequence number of the cell.

205: the preprocessing module of the destination port preprocesses the cell information in the UIF queue according to the SID, the packet sequence number and the state of the PF queue, so as to determine whether the cell information shall be inserted into a packet reassembly database.

Figure 2C:
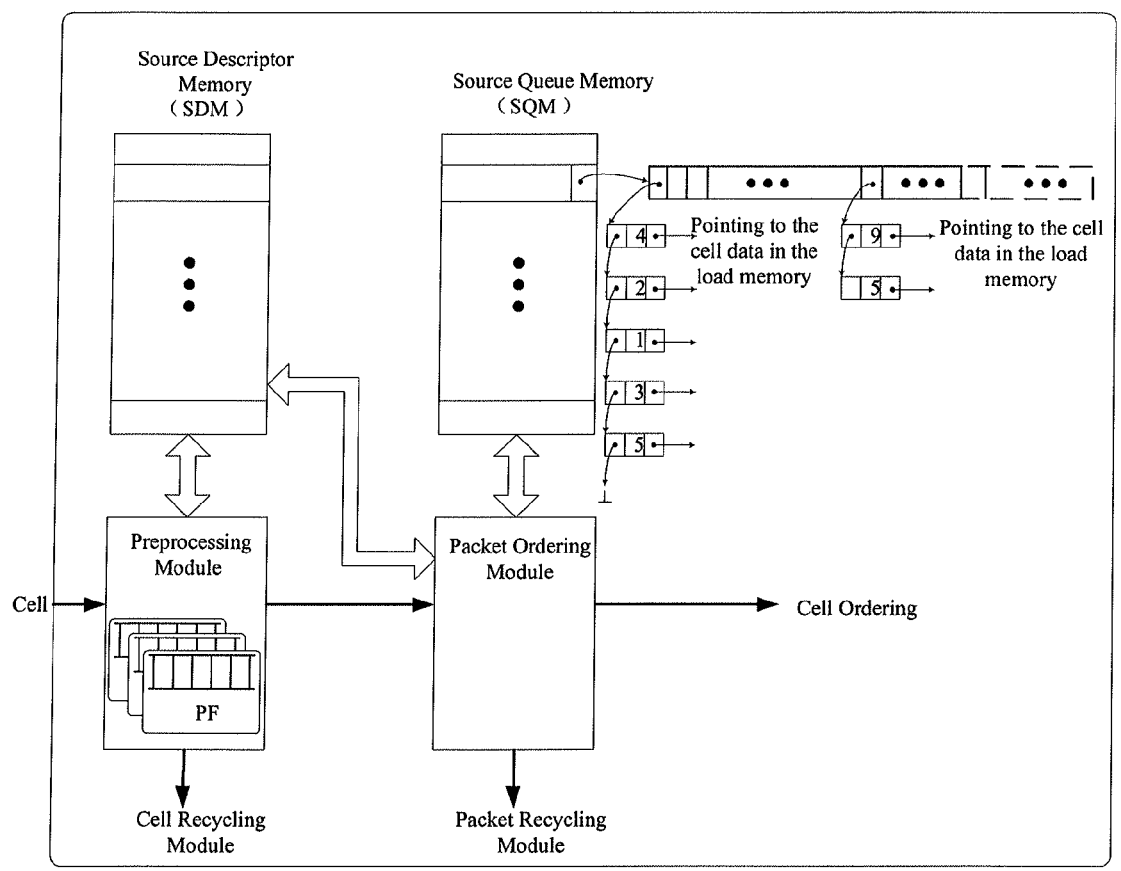
FIG. 2c is a view schematically illustrating a structure of a packet ordering and a packet reassembly database in the unicast.

In which, referring to FIG. 2c, the packet reassembly database is composed of an SDM and an SQM, wherein the SDM is configured to store source descriptors each corresponding to a source queue in the SQM; while the SQM is configured to store source queues each corresponding to a plurality of packet descriptors in the Reorder-Packet-Array-Buffer, and the SQM includes a pointer that points to the Reorder-Packet-Array-Buffer that is capable of accommodating 32 to 512 packet descriptors each pointing to a cell descriptor of the latest received cell belonging to the packet. Each cell descriptor includes a load memory index value pointing to the cell data in the load memory. The packet buffer may be directly accessed, and the access index may be calculated by subtracting the first packet sequence number from the current packet sequence number (Packet-Sequence-Number–First-Packet-Sequence).

The SQM may be constructed as a dynamic packet descriptor array, including N classes of memory blocks with different capacities. Each source descriptor includes a pointer that points to such memory blocks, and the class of the memory blocks is determined by the size of the required packet descriptor array. Insertion or deletion of a packet descriptor may require a switching from one memory block to another memory block. In order to obtain the bandwidth, the memory block supports simultaneous reading and writing, thus the read pointer needs not to be maintained, because after a packet is extracted, the position of a packet descriptor in the array will be shifted, and the read pointer always points to the start position.

Figure 2D:
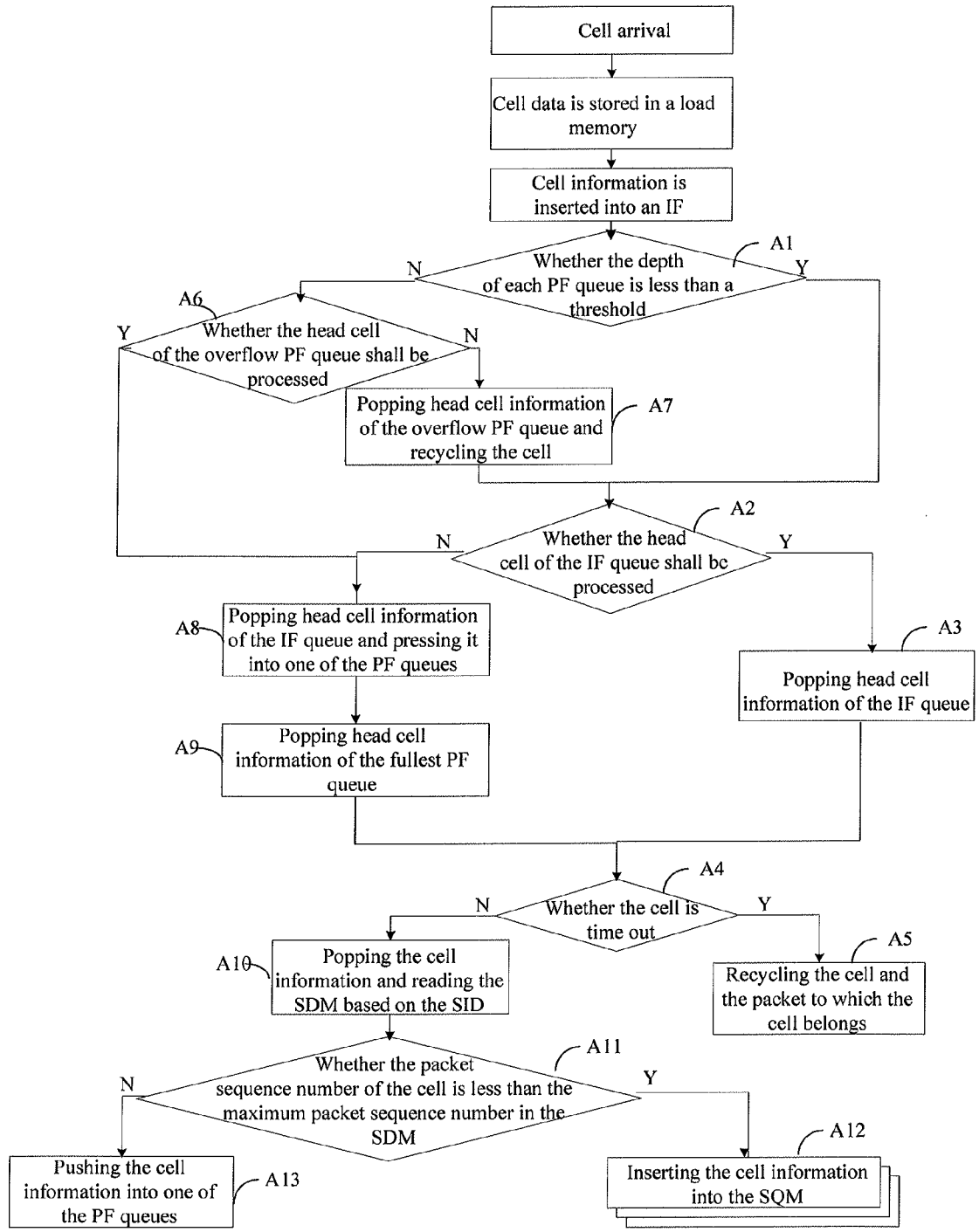
FIG. 2d is a flowchart of a preprocessing method in an embodiment of the present invention.

Referring to FIG. 2d, the concrete flow of the preprocessing may be as follows:

A1: the preprocessing module (Prepare Packet) of the destination port judges whether the depth of each PF queue is less than a preset threshold; if yes, performing step A2, otherwise performing step A7.

In which, when the depth of a certain PF queue is less than the preset threshold, it means that the PF queue has enough space to buffer more cells to be delayed, and the threshold may be set according to the requirement of the practical application.

A2: if the depth of each PF queue is less than the preset threshold, the preprocessing module of the destination port determines whether the cell corresponding to the head cell information of the UIF queue shall be processed according to the local timestamp; if yes, performing step A3, otherwise performing step A9.

A3: if the cell corresponding to the head cell information of the UIF queue shall be processed, the preprocessing module of the destination port pops head cell information of the IF queue, and then performing step A4.

A4: the preprocessing module of the destination port judges whether the cell corresponding to the popped head cell information of the IF queue or the cell corresponding to the popped head cell information of the PF queue is time out; if yes, performing step A5, otherwise performing step A10.

A5: if the cell is time out, the preprocessing module of the destination port recycles the cell corresponding to the head cell information and the packet to which the cell belongs, e.g., sends the cell corresponding to the head cell information to a cell recycling module, and sends the packet to which the cell belongs to a packet recycling module.

In which, the cell recycling module is mainly used to recycle cells, and the packet recycling module is mainly used to recycle packets.

A6: if not any PF queue has a depth less than the preset threshold, the preprocessing module of the destination port determines whether the cell corresponding to the head cell information of the overflow PF queue shall be processed according to the local timestamp; if yes, performing step A7, otherwise performing step A8.

In which, the overflow PF queue refers to a PF queue with a depth larger than the preset threshold.

A7: if the cell corresponding to the head cell information of the overflow PF queue shall not be processed, the preprocessing module pops the head cell information of the overflow PF queue, and recycles the cell corresponding to the head cell information, e.g., sending the cell corresponding to the head cell information to the cell recycling module, then returning to step A2.

A8: if the cell corresponding to the head cell information of the overflow PF queue shall be processed, the preprocessing module pops the head cell information of the IF queue, and pushes the head cell information into one of the PF queues, then performs step A9.

A9: the preprocessing module pops the head cell information of the fullest PF queue, then returns to step A4.

A10: if the cell is not time out, the preprocessing module pops the head cell information corresponding to the cell, and reads the SDM in the packet reassembly database based on the SID, then performs step A11.

A11: the preprocessing module judges whether the packet sequence number of the cell corresponding to the head cell information is larger than the maximum open packet sequence number in the SDM; if yes, performing step A12, otherwise performing step A13.

A12: the preprocessing module inserts the head cell information into the SDM.

A13: the preprocessing module inserts the head cell information into one of the PF queues.

As can be seen from the above preprocessing flow, generally the preprocessing module will delay a cell not located in the current open packet processing window until the open packet processing window covers the cell.

Optionally, a watchdog may be provided to check the PF queues. If it is checked that there is a non-empty PF queue not accessed for a long time, the watchdog triggers the preprocessing module to preferentially process that PF.

Further, in order to sufficiently utilize the space of the PF queue and avoid a burst generated by extracting data from the PF queue, the PF queue may be divided into a plurality of parallel queues according to the delay time required by the cell. The cell delay time may be estimated by subtracting the maximum packet sequence number in the current packet reassembly database from the packet sequence number of the current cell, and the larger the difference is, the longer the delay time required by the cell is.

206: the packet ordering module puts the packet descriptors into the Reorder-Packet-Array-Buffer, orders the packet descriptors in the Reorder-Packet-Array-Buffer according to the packet sequence numbers, and puts cell information having the same packet sequence number in the packet reassembly database into a packet ordering queue corresponding to the packet descriptor.

At that time, although the packet has been correctly ordered, the cells therein are still in a state of being disordered.

207: if the correctly ordered packet is a complete packet, the cell ordering module orders the cell information in the correctly ordered packet according to the cell sequence numbers to obtain the correctly ordered cell information.

In which, the cell ordering module may be constructed as a plurality of synchronous complete queues, and each CoS (also referred to as priority) may work independently using its control logic and data buffer queue.

The cell ordering module extracts the packet descriptor of each complete packet from the packet ordering queue, and adds it to corresponding complete queue according to the broadcast class and the CoS of a packet. Next, the cell ordering module inserts corresponding cell information into the cell ordering buffer according to the packet descriptor in the complete queue, and orders the extracted cell information in the cell ordering buffer according to the cell serial number.

In which, the complete packet means that all the cells of the packet are received by the packet reassembly database. The cell ordering buffer may accommodate two jumbo packets of about 20K bytes. Only when the data volume is less than the half, the packet descriptor is extracted and corresponding cell information is ordered.

Figure 2E:
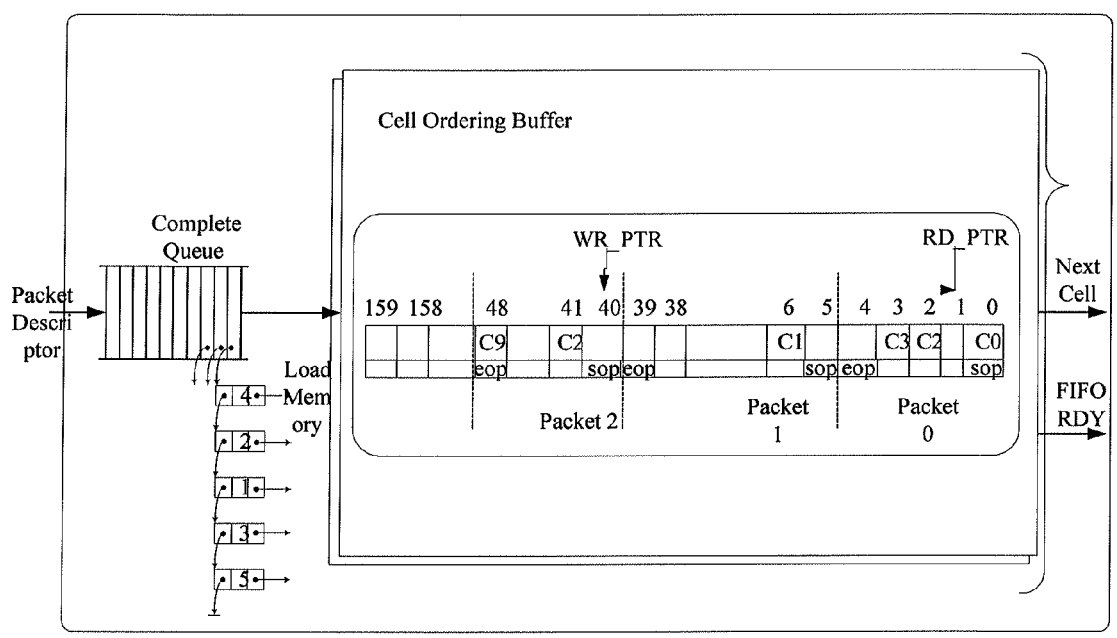
FIG. 2e is a view schematically illustrating a cell ordering mechanism in a method for packet reassembly and reordering provided by an embodiment of the present invention.

Referring to FIG. 2e, FIG. 2e is a view illustrating the cell ordering mechanism, the cell ordering buffer maintaining a read pointer (RD_PTR) and a write pointer (WR_PTR). The write pointer always points to the start position of the packet currently being ordered, and an offset position of the inserted cell information is calculated by adding the write pointer with the cell sequence number. The cell information ordering for the packet is not carried out until the size of the packet is smaller than that of the blank position in the cell ordering buffer. After cell information ordering for the next packet is completed, the read pointer starts to read the cell information of the present packet one by one. In which, "EOP" in FIG. 2e represents the last cell in a packet, and "SOP" represents the start position of the packet.

In which, the concatenated-cell may be processed as follows: when a first packet is inserted, the pointer of the last cell of the first packet may be inserted twice into the input FIFO. Meanwhile, a mark shall be added to a cell-synchronizing-buffer (the cell-reorder-buffer) to indicate that the first cell cannot be extracted to the reassembly mechanism. After the reassembly of the second cell is completed, the data will be discarded.

This is because when the source end slices a packet into cells, the last cell usually has data black hole, i.e., the packet cannot be sliced into several complete cells due to limited length, thus the last cell has less effective data than the previous complete cells. Such a cell will cause resource waste during the transmission and processing. The optimization measure is not to slice the packet into cells per packet, but regards continuous packets as a data stream and slices the data stream into cells so that all cells have the complete data segment. However, in that case, some cells certainly include both the last segment of data of the previous packet and the first segment of data of the next packet. Such a cell that includes both the last segment of data of the previous packet and the first segment of data of the next packet is called as the concatenated-cell. During the cell reordering, the attribute of a cell shall be known and the "SOP" and "EOP" shall be marked out. The concatenated-cell is not only the EOP cell of the previous packet, but also the SOP cell of the next packet. Thus after such a concatenated-cell is received, it shall be inserted twice into the input FIFO queue: one serving as the EOP cell of the previous packet and the other serving as the SOP cell of the next packet. As a result, when the cells need to be reordered, the two cells will continuously exist in the cell ordering module. However, the two cells cannot be both submitted to the packet reassembling unit because they have the same content. Thus, a first cell with its flag identified as the EOP cannot be submitted to the packet reassembling module. Instead, the first cell will be discarded after the packet reordering for the second cell is completed, so as to ensure that only one copy of data is submitted to the packet reassembling module.

When a packet is ready to be reassembled, the cell ordering buffer will send to the reassembly mechanism an indication signal (e.g., FIFO_RDY signal) which requests a packet reassembly.

To be noted, the cell ordering mechanism (including the cell ordering buffer and the complete queue) consists of a plurality of parallel FIFO queues, which are distinguished based on the CoS (also referred to as priority) of a packet and the broadcast class, thereby eliminating the require of additional queues by the ordering mechanism and saving the resources.

208: after receiving an indication signal (e.g., FIFO_RDY signal) which requests a packet reassembly, the packet reassembling module reads the correctly ordered cell information in the cell ordering buffer one by one, and extracts cell data according to the read cell information for a packet reassembly.

There may be a plurality of cell ordering buffers that simultaneously send an indication signal requesting packet reassembly to the packet reassembling module. In that case, the packet reassembling module may arbitrate, based on the CoS (i.e., priority) of a packet, between the plurality of cell ordering buffers that send the indication signal (e.g., FIFO_RDY signal) requesting packet reassembly, so as to select a proper cell ordering buffer, then read the correctly ordered cell information in the selected cell ordering buffer one by one, and extract cell data from the load memory according to the read cell information (specifically, the load memory index value in the cell information), so as to reassemble a packet.

As can be seen from the above description, this embodiment preprocesses the received cell information according to the SID, so as to determine whether the received cell shall be inserted into the packet reassembly database, then directly orders the cell information in the database according to the packet sequence number and the cell sequence number in the cell information, and finally extracts corresponding cell data according to the ordered cell information, so as to achieve the packet reassembly. Since the solution can directly reorder and reassemble the packets according to the source, it is suitable for equipments with high performance as compared with the prior art that reorders and reassembles the packets based on the time scale synchronization. In addition, since the solution can control and mange the received cell (i.e., the packet waiting to be reassembled), utilization ratio of resources is high, and less memories and control resources are occupied.

Embodiment 3

The method described in Embodiment 2 is also suitable for the multicast data. The multicast mainly differs from the unicast as follows:

The unicast packet requires the SDM and uses {priority, source port number} as the index. The multicast packet requires the MGID descriptor memory, and uses the hash value of {priority, MGID, source port number} as the index, wherein the MGID means a group of destination ports belonging to the same replication domain. Correspondingly, in the multicast, the SQM of the unicast is replaced by the MGID queue memory. That is, the packet reassembly database for multicast specifically may be as follows:

the packet reassembly database for multicast may include an MGID descriptor memory and an MGID queue memory, wherein the MGID descriptor memory is configured to store MGID descriptors and take the hash value of {priority, MGID, source port number} as the index, while the MGID queue memory is configured to store MGID queues corresponding to the MGID descriptors; the MGID queue memory may include a pointer that points to the Reorder-Packet-Array-Buffer, which stores the packet descriptors of the cells waiting to be ordered, each of the packet descriptors pointing to a cell descriptor of a latest received cell belonging to the packet.

In which, the MGID queue memory may be constructed as a dynamic packet descriptor array, including M classes of memory blocks with different capacities, wherein M is a positive integer. Each MGID descriptor includes a pointer that points to such memory blocks, and the class thereof is determined by the size of the required packet descriptor array.

To be noted, as a hash function is employed to access the MGID descriptor memory and the MGID queue memory, the rows of the memories may correspond to a plurality of sources (i.e., {priority, MGID, source port number}). Since the rows of the memories are applied for one source, a new requirement is proposed that when resources are applied for a new multicast source, it shall be checked that the rows are released. In order to solve this problem, another memory is required to maintain those information.

Further to be noted, as the hash function is employed, a resource conflict may be caused. Thus a Fully Associative Victim Table (FAVT) shall be maintained, so that when a resource conflict occurs, a cell in which the resource conflict occurs may be pushed into another MGID queue or discarded according to the preset FAVT. In order to prevent the FAVT from being full, a threshold may be set, which is referred to as a first threshold in this embodiment. When the amount of the information in the FAVT exceeds the first threshold, a piece of control information is activated and sent to the source, so as to reduce the traffic of multicast data sent to the destination port.

The ordering mechanism and the reassembly mechanism of the multicast are the same as those of the unicast, and herein are omitted, please refer to Embodiment 2 of details.

As can be seen from the above description, the method for packet reassembly and reordering provided by the embodiment of the present invention is suitable for both the unicast and the multicast, and can achieve the same beneficial effect as Embodiment 2.

Embodiment 4

In order to prevent too much time from being spent in the reassembly and reordering of a certain packet (i.e., avoid the timeout traffic), on the basis of the above method embodiments, it may be further checked that the cells and the packet to which the cells belong will not spend too much time in a fabric switch or during a packet reassembly according to the local timestamp. The details are described as follows.

(I) Reassembly Timeout

In order to check that a packet will not spend too much time during a packet reassembly, each packet descriptor shall include an Earliest-Cell-Timestamp which indicates arrival time of a cell firstly arriving at the destination port among all the cells of the packet. If a difference between the current time and the Earliest-Cell-Timestamp is larger than a preset second threshold, the packet is marked with reassembly timeout. When this packet arriving at the head of the packet descriptor array, this packet will be popped out of the queue and discarded even if all the cells of the packet are still not received (no longer waiting for receiving other cells of the packet). Otherwise, before the packet arrives at the head of the ordering array, it is not judged whether the packet is reassembly timeout, instead, the following operation is performed:

Updating the field Earliest-Cell-Timestamp in the packet descriptor when the first cell of each packet is inserted;

when a packet arrives at the head of the packet descriptor array, the Earliest-Cell-Timestamp is duplicated into a source descriptor to which it belongs;

when a cell is inserted, the Earliest-Cell-Timestamp in the source descriptor will be checked, in spite of which packet the arrived cell belongs to. For example, in a case of a certain source has no arrived data, a Silent-Source-Detection (SSD) will trigger such check.

The time out packet will be transferred to the packet recycle mechanism for a processing.

(II) Fabric Timeout

The packet spending too much time in the fabric switch can be directly discarded without waiting for a reassembly timeout. That is, the method for packet reassembly and reordering may further include:

the destination port discards the packet when it determines that the estimated value for a delay (i.e., the transmission time of the packet in the fabric switch) of the fabric switch exceeds the preset third threshold.

In which, the transmission time of the packet in the fabric switch may be estimated at the destination port according to the packet sequence number. For the details please refer to the prior art, and herein are omitted.

As can be seen from the above description, the present embodiment not only achieves the same beneficial effects as Embodiments 2 and 4, but also monitors the transmission time of the packet in the fabric switch and the packet reassembly time according to the local timestamp, thereby avoiding causing too long a delay, and helping to improve the efficiency of the packet reassembly and reordering.

Embodiment 5

Figure 3A:
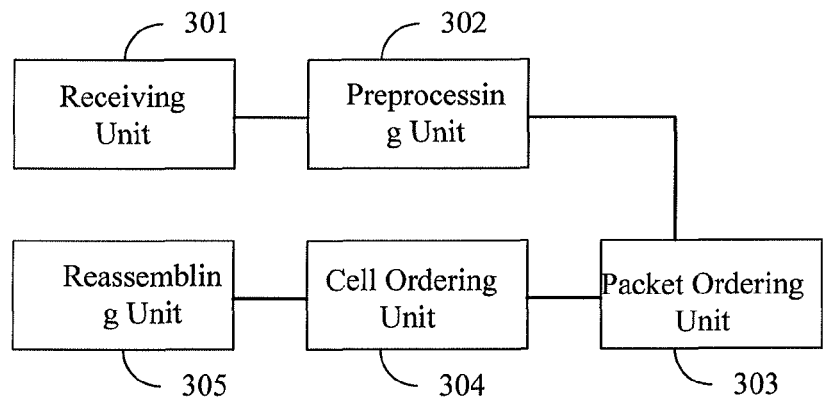
FIG. 3a is a structure diagram of a network device provided by an embodiment of the present invention.

In order to better implement the above method, the embodiments of the present invention further provide a network device which specifically may be used as a destination port. By referring to FIG. 3a, the network device includes a receiving unit 301, a preprocessing unit 302, a packet ordering unit 303, a cell ordering unit 304 and a reassembling unit 305.

The receiving unit 301 is configured to receive a cell sent by a source port, wherein the cell carries an SID, a packet sequence number and a cell sequence number, and the SID specifically may be used as a source port number.

The preprocessing unit 302 is configured to preprocess the cell received by the receiving unit 301 according to the SID to determine whether the cell shall be inserted into the database.

The packet ordering unit 303 is configured to order the cells in the packet reassembly database according to the packet sequence number to obtain the correctly ordered packet.

The cell ordering unit 304 is configured to, if the packet is determined to as a complete packet, order the cells of the correctly ordered packet obtained by the packet ordering unit 303 according to the cell sequence number, so as to obtain the correctly ordered cells.

The reassembling unit 305 is configured to perform a packet reassembly for the correctly ordered cells obtained by the cell ordering unit 304.

In which, the cell may include cell data and cell information. In order to save the resources, just the cell information is operated during the ordering process, and only when a packet reassembly is performed by the reassembling unit 305, corresponding cell data is extracted according to the cell information, so as to perform the reassembly.

Figure 3B:
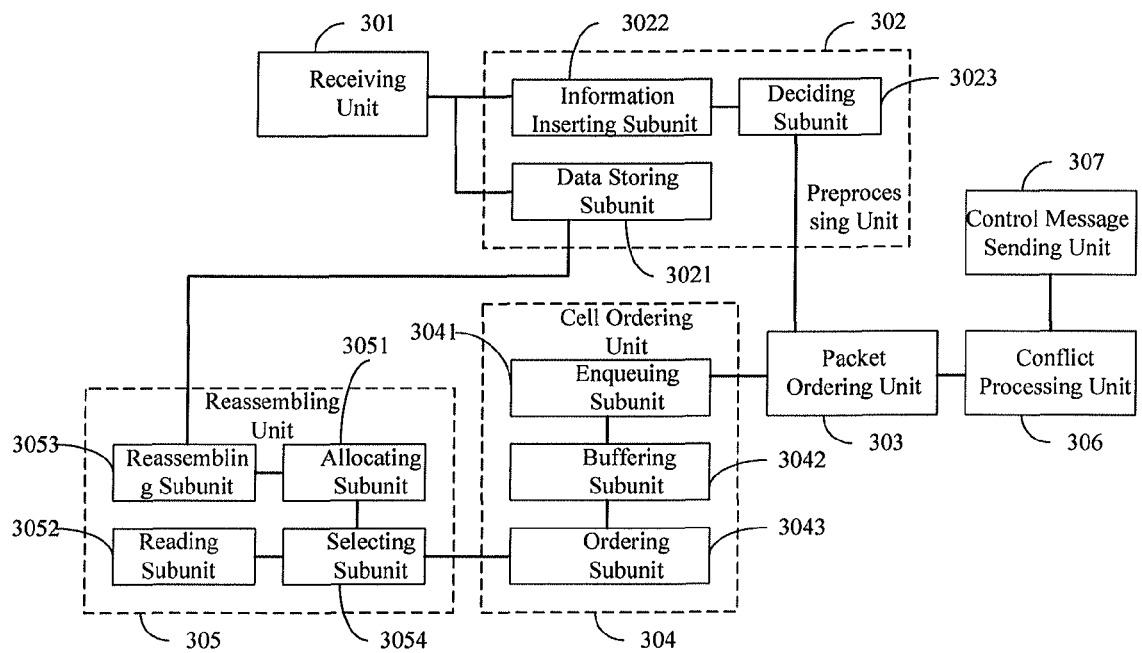
FIG. 3b is another structure diagram of a network device provided by an embodiment of the present invention.

Referring to FIG. 3b, the preprocessing unit 302 may include a data storing subunit 3021, an information inserting subunit 3022 and a deciding subunit 3023.

The data storing subunit 3021 is configured to stamp the cell received by the receiving unit 301 with a local time stamp of the arrival, store cell data of the cell in a load memory according to the SID, and configure corresponding load memory index value.

The information inserting subunit 3022 is configured to insert the cell information of the cell received by the receiving unit 301 into an IF queue, wherein the cell information includes information of the cell such as the SID, the local time stamp, the load memory index value, the packet sequence number and the cell sequence number.

The deciding subunit 3023 is configured to process the cell information inserted into the IF queue by the information inserting subunit 3022 according to the SID, the packet sequence number and the state of the PF queue, to determine whether the cell information shall be inserted into the packet reassembly database, e.g., the details may be as follows.

the deciding subunit 3023 is specifically configured to, if the depth of each PF queue is less than a preset threshold, determine whether a difference between the packet sequence number of the cell corresponding to the head cell information of the IF queue and the minimum packet sequence number of the packet currently being processed is less than a fourth threshold; if yes, pop the head cell information of the IF queue; if not, push the head cell information of the IF queue into one of the PF queues, and pop the head cell information of the fullest PF queue; judge whether the cell corresponding to the popped head cell information of the IF queue or the cell corresponding to the popped head cell information of the PF queue is time out; if yes, recycle the cell corresponding to the cell information and the packet to which the cell belongs; if not, insert the cell information into the packet reassembly database, when the packet sequence number of the cell is less than the maximum open packet sequence number of the same source in the packet reassembly database; and insert the cell information into one of the PF queues, when the packet sequence number of the cell is larger than the maximum open packet sequence number of the same source in the packet reassembly database.

the deciding subunit is further configured to, if the depth of a certain PF queue is larger than the preset threshold, determine whether a difference between the packet sequence number of the cell corresponding to the head cell information of the overflow PF queue and the minimum packet sequence number of the packet currently being processed is less than a fourth threshold according to the local timestamp; if yes, recycle the cell corresponding to the head cell information of the overflow PF queue, then perform the step of determining whether the difference between the packet sequence number of the cell corresponding to the head cell information of the IF queue and the minimum packet sequence number of the packet currently being processed is less than the fourth threshold; and if not, performing the step of pushing the head cell information of the IF queue into one of the PF queues, and popping the head cell information of the fullest PF queue.

For the details, please see the preprocessing flows in Embodiments 1-2 and FIG. 2d.

Specifically, the packet reassembly database may be designed for the unicast and the multicast, respectively. For example, in one packet reassembly database, a packet reassembly databases for the unicast and the multicast respectively may be provided.

In which, for the unicast, the packet reassembly database may include the SDM and the SQM, wherein the SDM is configured to store source descriptors and take the CoS of a packet and the source port number as the index, i.e., employ {CoS of a packet, source port number} as the index; while the SQM is configured to store source queues corresponding to the source descriptors, and the SQM may include a pointer that points to the Reorder-Packet-Array-Buffer, which stores the packet descriptors of the cells waiting to be ordered, each of the packet descriptors pointing to a cell descriptor of a latest received cell belonging to the packet.

In which, the SDM and the SQM may be constructed by dynamic packet descriptor arrays, including N classes of memory blocks of different capacities, wherein N is a positive integer.

For the multicast, the packet reassembly database includes the MGID descriptor memory and the MGID queue memory, wherein the source MGID descriptor memory is configured to store MGID descriptors and take the CoS of a packet, the MGID and the source port number as the index, e.g., employ the hash value of {CoS of a packet, MGID, source port number} as the index, while the MGID queue memory is configured to store MGID queues corresponding to the MGID descriptors; the MGID queue memory may include a pointer that points to the Reorder-Packet-Array-Buffer, which stores the packet descriptors of the cells waiting to be ordered, each of the packet descriptors pointing to a cell descriptor of a latest received cell belonging to the packet.

In which, the MGID descriptor memory and the MGID queue memory are dynamic packet descriptor arrays, including M classes of memory blocks of different capacities, wherein M is a positive integer.

The MGID descriptor memory and the MGID queue memory support the hash function, i.e., each process (e.g., IF queue, PF queue, complete queue, Reorder-Packet-Array-Buffer and cell ordering buffer) may access the MGID descriptor memory and the MGID queue memory through the hash function. That is, the packet ordering unit 303 is specifically configured to access the MGID descriptor memory and the MGID queue memory through the hash function.

In which, the hash function may be constructed as multiple hash buckets. The employment of the hash function may cause a resource conflict, thus an FAVT shall need to be maintained, so that when a resource conflict occurs, the cell occurring the resource conflict can be pushed into another MGID queue or discarded according to the preset FAVT. Thus as illustrated in FIG. 3b, the network device may further include a conflict processing unit 306.

The conflict processing unit 306 is configured to, when a resource conflict occurs, push a cell in which the resource conflict occurs into another MGID queue or discard (i.e., recycle) the cell according to the preset FAVT. Specifically, when the packet ordering unit 303 accesses the MGID descriptor memory and the MGID queue memory through hash function, if a resource conflict occurs, the cell in which the resource conflict occurs will be pushed into another MGID queue or discarded according to the preset FAVT.

Further, in order to prevent the FAVT from being full, a threshold may further be set, referred to as a first threshold in the embodiment of the present invention. When the amount of the information in the FAVT exceeds the first threshold, a piece of control information is activated and sent to the source, so as to reduce the traffic of multicast data sent to the destination port. Thus as illustrated in FIG. 3b, the network device may further include a control message sending unit 307.

The control message sending unit 307 is configured to, when the amount of the information in the FAVT exceeds the preset first threshold, active a destination port to send control information to the multicast source, so as to reduce the traffic of multicast data sent to the destination port.

In which, as illustrated in FIG. 3b, the cell ordering unit 304 may include an enqueuing subunit 3041, a buffering subunit 3042 and an ordering subunit 3043.

The enqueuing subunit 3041 is configured to, when it is determined that the packet ordered by the packet ordering unit 302 is a complete packet, add the packet descriptor of the complete packet into corresponding complete queue according to the broadcast class and the priority of the cell.

The buffering subunit 3042 is configured to insert corresponding cell information into the cell ordering buffer according to the packet descriptor in the complete queue.

The ordering subunit 3043 is configured to order the extracted cell information in the cell ordering buffer according to the cell sequence number.

In which, the cell ordering buffer maintains a read pointer that reads the ordered cell information one by one for a packet reassembly, and a write pointer that always points to the start position of a packet currently undergoing a cell ordering. Thus an offset position of the inserted cell information may be calculated by adding the write pointer with the cell sequence number, and then the position of the inserted cell information in the packet is adjusted according to the offset position, so as to obtain the correctly ordered cell information. That is:

the ordering subunit 3043 is specifically configured to calculate an offset position of the inserted cell information by adding the write pointer with the cell sequence number, and adjust the position of the inserted cell information in the packet according to the offset position.

In which, as illustrated in FIG. 3b, the reassembling unit 305 may include an allocating subunit 3051, a reading subunit 3052 and a reassembling subunit 3053.

The allocating subunit 3051 is configured to allocate the packet to which the cell information correctly ordered by the cell ordering unit 304 (specifically may be the ordering subunit 3043) belongs to reassembly resources.

The reading subunit 3052 is configured to read the correctly ordered cell information in the cell ordering buffer one by one.

The reassembling subunit 3053 is configured to acquire corresponding cell data according to the cell information read by the reading subunit 3052, and perform a packet reassembly on the acquired cell data using the reassembly resources allocated by the allocating subunit 3051. For example, the reassembling subunit 3053 may read the cell data stored in the load memory by the data storing subunit 3021 according to the cell information read by the reading subunit 3052.

Further, in order to improve the efficiency, the packet to which the correctly ordered cell information belongs may be allocated with at least two reassembly resources, i.e.:

the allocating subunit 3051 is further configured to allocate at least two reassembly resources to the packet to which the correctly ordered cell information belongs.

In which, in order to save resources, the reassembly resources are managed in a resource pool and allocated to each source only when necessary, i.e., when a reassembly is to be made. For example, after the cells in the ordering buffer are correctly ordered, an indication signal (e.g., FIFO_RDY signal) requesting packet reassembly may be sent to a packet reassembly mechanism, and packet reassembly mechanism starts a packet reassembly of the cells in the ordering buffer after receiving the indication signal requesting packet reassembly.

Of course, when there are at least two cell ordering buffers, the packet reassembly mechanism may simultaneously receive multiple indication signals requesting packet reassembly. In that case, the packet reassembly mechanism may select the cell ordering buffer for a processing according to the CoS of a packet. That is, the reassembling unit may further include a selecting subunit 3054.

The selecting subunit 3054 is configured to select a cell ordering buffer according to the CoS of a packet.

Then, the allocating subunit 3051 is specifically configured to allocate reassembly resources to the packet to which the correctly ordered cell information in the cell ordering buffer selected by the selecting subunit 3054 belongs.

The reading subunit 3052 is configured to read the correctly ordered cell information in the cell ordering buffer selected by the selecting subunit 3054 one by one.

In order to prevent too much time from being spent in the reassembly and reordering for a certain packet (i.e., avoid the timeout traffic), it may be further checked that the cells and the packet to which the cells belong will not spend too much time in the fabric switch or during the packet reassembly according to the local timestamp. Thus as illustrated in FIG. 3b, the network device may further include a discarding unit.

The discarding unit is configured to discard the packet when determining that the packet reassembly is time out.

The discarding unit is specifically configured to determine that a packet reassembly is time out when a difference between the arrival time of the cell firstly arriving at the destination port in a packet and the current time is larger than a preset second threshold. The details may be as follows:

Each packet descriptor includes an Earliest-Cell-Timestamp which indicates arrival time of a cell firstly arriving at the destination port among all the cells of the packet. If the difference between the current time and the Earliest-Cell-Timestamp is larger than the preset second threshold, the packet is marked with reassembly timeout. When arriving at the head of the packet descriptor array, the packet will be popped out of the queue and discarded even if all the cells of the packet are still not received (no longer waiting for receiving other cells of the packet).

In addition, the packet delaying too much time in the fabric switch can also be discarded directly. In that case, a reassembly timeout may be no longer waited for. The details may be as follows:

The receiving unit 301 is specifically configured to receive a cell sent by the source port through the fabric switch.

Then, the discarding unit is further configured to discard the packet when it is determined that estimated value of delay of the fabric switch exceeds the preset third threshold.

In which, the transmission time of the packet in the fabric switch may be obtained by estimating at the destination port according to the packet sequence number. For the details please refer to the prior art, and herein are omitted.

The second and third thresholds may be set according to the requirement of the practical application.

Concretely, the above units may be implemented as individual entities, respectively, or implemented as a same or several entities. For example, the preprocessing unit 302 may be implemented by the preprocessing module in Embodiment 2, the packet ordering unit 303 may be implemented by the packet ordering module in Embodiment 2, the cell ordering unit 304 may be implemented by the cell ordering module in Embodiment 2, the reassembling unit 305 may be implemented by the packet reassembling module in Embodiment 2, and the discarding unit may be implemented by the packet recycling module and the signaling recycle module in Embodiment 2, etc.

Please refer to the previous embodiments for the implementations of the above units, and herein are omitted.

As can be seen from the above description, the preprocessing unit 302 of the network device in this embodiment preprocesses the received cell according to the SID, so as to determine whether the received cell shall be inserted into the packet reassembly database, then the packet ordering unit 303 and the cell ordering unit 304 directly order the cells in the database according to the packet sequence number and the cell sequence number of the cell, and finally the reassembling unit 305 performs a packet reassembly according to the ordered cells. Since the solution can directly reorder and reassemble the packets according to the source, it is suitable for equipments with high performance as compared with the prior art that reorders and reassembles the packets based on the time scale synchronization. In addition, since the solution can control and mange the received cell (i.e., the packet waiting to be reassembled), the utilization ratio of resources is high, and less memories and control resources are occupied.

Embodiment 6

Accordingly, the embodiments of the present invention further provide a communication system correspondingly, including a source port device and any network device provided by the embodiments of the present invention, wherein the network device serves as a destination port (that is, it is called as a destination port device). Please refer to the previous embodiments for the details, for example:

The destination port device serving as a destination port is configured to receive a cell sent by a source port, wherein the cell carries an SID, a packet sequence number and a cell sequence number; preprocess the received cell according to the SID to determine whether the cell shall be inserted into a packet reassembly database; order cells in the packet reassembly database according to the packet sequence number to obtain a correctly ordered packet; if the correctly ordered packet is a complete packet, order cells of the correctly ordered packet according to the cell sequence number to obtain correctly ordered cells; and perform a packet reassembly for the correctly ordered cells.

The source port device serving as a source port is configured to send a cell to the destination port device, wherein the cell carries an SID, a packet sequence number and a cell sequence number.

In which, the destination port device is specifically configured to stamp the received cell with a local time stamp of the arrival, store cell data of the cell in a load memory according to the SID, and configure corresponding load memory index value; insert the cell information of the cell into an IF queue, wherein the cell information includes the SID, the local time stamp, the load memory index value, the packet sequence number and the cell sequence number; and process the cell information in the IF queue according to the SID, the local time stamp and the state of the PF queue, to determine whether the cell information shall be inserted into the cell reassembly database. Please refer to the previous method embodiment and FIG. 2d for the details.

Please refer to the previous embodiments for the implementations of the above devices, and herein are omitted.

As can be seen from the above description, the destination port device of the communication system in this embodiment preprocesses the received cell according to the SID, so as to determine whether the received cell shall be inserted into the packet reassembly database, then directly orders the cells in the database according to the packet sequence number and the cell sequence number of the cell, and finally achieves a packet reassembly. Since the solution can directly reorder and reassemble the packets according to the source, it is suitable for equipments with high performance as compared with the prior art that reorders and reassembles the packets based on the time scale synchronization. In addition, since the solution can control and mange the received cell (i.e., the packet waiting to be reassembled), the utilization ratio of resource is high, and less memories and control resources are occupied.

A person skilled in the art shall appreciate that all or a part of steps for implementing the various methods in above embodiments may be completed by instructing relevant hardware through a program that can be stored in a computer readable storage medium. The storage medium may include Read Only Memory (ROM), Random Access Memory (RAM), magnetic disc, optical disc, etc.

A method, an apparatus and a system for packet reassembly and reordering provided by the embodiments of the present invention are detailedly introduced as above, and the principle and implementation of the present invention are described though specific examples. However, the descriptions of the above embodiments just help to understand the method of the present invention and its core idea. Meanwhile, a person skilled in the art may change the specific implementation and the application range according to the idea of the present invention. Therefore, the contents of the specification shall not be construed as a limitation to the present invention.

What is claimed is:

1. A method for packet reassembly and reordering, comprising:
    receiving a cell sent by a source port, wherein the cell carries a Source Identification (SID), a packet sequence number and a cell sequence number;
    preprocessing the received cell according to the SID to determine whether the cell shall be inserted into a packet reassembly database;
    ordering cells in the packet reassembly database according to the packet sequence number to obtain a correctly ordered packet;
    determining that the correctly ordered packet is a complete packet after ordering the cells in the packet reassembly database according to the packet sequence number;
    ordering the cells of the correctly ordered packet according to the cell sequence number to obtain correctly ordered cells after determining that the correctly ordered packet is a complete packet; and
    performing a packet reassembly on the correctly ordered cells after ordering the cells of the correctly ordered packet according to the cell sequence number,
    wherein preprocessing the received cell according to the SID to determine whether the cell shall be inserted into the packet reassembly database comprises:
        stamping the received cell with a local time stamp of the arrival, storing cell data of the cell in a load memory according to the SID, and configuring corresponding load memory index value;
        inserting cell information of the cell into an Input FIFO (IF) queue, wherein the cell information comprises the SID, the local time stamp, the load memory index value, the packet sequence number and the cell sequence number; and
        processing the cell information in the IF queue according to the SID, the packet sequence number and the state of a Postponed FIFO (PF) queue, to determine whether the cell information shall be inserted into the cell reassembly database.

2. The method according to claim 1, wherein processing the cell information in the IF queue according to the SID, the packet sequence number and the state of the PF queue, to determine whether the cell information shall be inserted into the cell reassembly database comprises:
    if the depth of each PF queue is less than a preset threshold, determining whether a difference between the packet sequence number of a cell corresponding to head cell information of the IF queue and the minimum packet sequence number of a packet currently being processed is less than a fourth threshold;
    if yes, popping the head cell information of the IF queue;
    if not, pushing the head cell information of the IF queue into one of the PF queues, and popping the head cell information of the fullest PF queue;
    judging whether the cell corresponding to the popped head cell information of the IF queue or the cell corresponding to the popped head cell information of the PF queue is time out;
    if yes, recycling the cell corresponding to the cell information and the packet to which the cell belongs;
    if not, inserting the cell information into the packet reassembly database, when the packet sequence number of the cell is less than the maximum packet sequence number of the same source in the packet reassembly database; and inserting the cell information into one of the PF queues, when the packet sequence number of the cell is larger than the maximum packet sequence number of the same source in the packet reassembly database.

3. The method according to claim 2, further comprising:
    if the depth of a certain PF queue is larger than the preset threshold, determining whether a difference between the packet sequence number of a cell corresponding to head cell information of an overflow PF queue and the minimum packet sequence number of a packet currently being processed is less than a fifth threshold;
    if yes, recycling the cell corresponding to the head cell information of the overflow PF queue, then performing the step of determining whether the difference between the packet sequence number of the cell corresponding to the head cell information of the IF queue and the minimum packet sequence number of the packet currently being processed is less than the fourth threshold; and
    if not, performing the step of pushing the head cell information of the IF queue into one of the PF queues, and popping the head cell information of the fullest PF queue.

4. The method according to claim 1, wherein,
    the packet reassembly database comprises a Source Descriptor Memory (SDM) and a Source Queue Memory (SQM), wherein the SDM is configured to store source descriptors and take the Class of Service (CoS) of a packet and the SID as the index, while the SQM is configured to store source queues corresponding to the source descriptors; the SQM comprises a pointer that points to a Reorder-Packet-Array-Buffer, which stores the packet descriptors of the cells waiting to be ordered, each of the packet descriptors pointing to a cell descriptor of a latest received cell belonging to the packet.

5. The method according to claim 1, wherein,
the packet reassembly database comprises a Multicast Group ID (MGID) descriptor memory and a MGID queue memory, wherein the MGID descriptor memory is configured to store MGID descriptors and take the CoS of a packet, the MGID and the SID as the index, while the MGID queue memory is configured to store MGID queues corresponding to the MGID descriptors; the MGID queue memory comprises a pointer that points to a Reorder-Packet-Array-Buffer, which stores the packet descriptors of the cells waiting to be ordered, each of the packet descriptors pointing to a cell descriptor of a latest received cell belonging to the packet.

6. The method according to claim 1, wherein,
the packet reassembly database comprises a Source Descriptor Memory (SDM) and a Source Queue Memory (SQM), wherein the SDM is configured to store source descriptors and take the Class of Service (CoS) of a packet and the SID as the index, while the SQM is configured to store source queues corresponding to the source descriptors; the SQM comprises a pointer that points to a Reorder-Packet-Array-Buffer, which stores the packet descriptors of the cells waiting to be ordered, each of the packet descriptors pointing to a cell descriptor of a latest received cell belonging to the packet.

7. The method according to claim 6, wherein,
the Reorder-Packet-Array-Buffer is a dynamic packet descriptor array, comprising a positive integer number classes of memory blocks of different capacities.

8. The method according to claim 1, wherein,
the packet reassembly database comprises a Multicast Group ID (MGID) descriptor memory and a MGID queue memory, wherein the MGID descriptor memory is configured to store MGID descriptors and take the CoS of a packet, the MGID and the SID as the index, while the MGID queue memory is configured to store MGID queues corresponding to the MGID descriptors; the MGID queue memory comprises a pointer that points to a Reorder-Packet-Array-Buffer, which stores the packet descriptors of the cells waiting to be ordered, each of the packet descriptors pointing to a cell descriptor of a latest received cell belonging to the packet.

9. A network device, comprising:
a receiver, configured to receive a cell sent by a source port, wherein the cell carries a Source Identification (SID), a packet sequence number and a cell sequence number; and
a processor, configured to preprocess the cell received by the receiver according to the SID to determine whether the cell shall be inserted into a packet reassembly database, order the cells in the packet reassembly database according to the packet sequence number to obtain the correctly ordered packet, determine that the correctly ordered packet is a complete packet after ordering the cells in the packet reassembly database according to the packet sequence number, order the cells of the correctly ordered packet according to the cell sequence number to obtain correctly ordered cells after determining that the correctly ordered packet is a complete packet, perform a packet reassembly on the correctly ordered cells after ordering the cells of the correctly ordered packet according to the cell sequence number, stamp the received cell with a local time stamp of the arrival, store cell data of the cell in a load memory according to the SID, and configure corresponding load memory index value; insert cell information of the cell into an Input FIFO (IF) queue, wherein the cell information comprises the SID, the local time stamp, the load memory index value, the packet sequence number and the cell sequence number; and process the cell information in the IF queue according to the SID, the packet sequence number and the state of a Postponed FIFO (PF) queue, to determine whether the cell information shall be inserted into the cell reassembly database.

10. The network device according to claim 9, wherein,
the processor is specifically configured to, if the depth of each PF queue is less than a preset threshold, determine whether a difference between the packet sequence number of a cell corresponding to head cell information of the IF queue and the minimum packet sequence number of a packet currently being processed is less than a fourth threshold; if yes, pop the head cell information of the IF queue; if not, push the head cell information of the IF queue into one of the PF queues, and pop the head cell information of the fullest PF queue; judge whether the cell corresponding to the popped head cell information of the IF queue or a cell corresponding to head cell information of the PF queue is time out; if yes, recycle the cell corresponding to the cell information and the packet to which the cell belongs; if not, insert the cell information into the packet reassembly database, when the packet sequence number of the cell is less than the maximum packet sequence number of the same source in the packet reassembly database; and insert the cell information into one of the PF queues, when the packet sequence number of the cell is larger than the maximum packet sequence number of the same source in the packet reassembly database.

11. The network device according to claim 10, wherein,
the processor is specifically configured to, if the depth of a certain PF queue is larger than the preset threshold, determine whether a difference between the packet sequence number of a cell corresponding to head cell information of an overflow PF queue and the minimum packet sequence number of a packet currently being processed is less than a fifth threshold; if yes, recycle the cell corresponding to the head cell information of the overflow PF queue, then perform the step of determining whether the difference between the packet sequence number of the cell corresponding to the head cell information of the IF queue and the minimum packet sequence number of the packet currently being processed is less than the fourth threshold; and if not, perform the step of pushing the head cell information of the IF queue into one of the PF queues and popping the head cell information of the fullest PF queue.

12. The network device according to claim 9, wherein, the packet reassembly database comprises a Source Descriptor Memory (SDM) and a Source Queue Memory (SQM), wherein the SDM is configured to store source descriptors and take the packet Class of Service (CoS) and the SID as the index, while the SQM is configured to store source queues corresponding to the source descriptors; the SQM comprises a pointer that points to a Reorder-Packet-Array-Buffer, which stores the packet descriptors of the cells waiting to be ordered, each of the packet descriptors pointing to a cell descriptor of a latest received cell belonging to the packet.

13. The network device according to claim 9, wherein, the packet reassembly database comprises a Multicast Group ID (MGID) descriptor memory and a MGID queue memory, wherein the MGID descriptor memory is configured to store MGID descriptors and take the CoS of a packet, the MGID and a source port number as the index, while the MGID queue memory is configured to store MGID queues corresponding to the MGID descriptors; the MGID queue memory comprises a pointer that points to a Reorder-Packet-Array-Buffer, which stores the packet descriptors of the cells waiting to be ordered, each of the packet descriptors pointing to a cell descriptor of a latest received cell belonging to the packet.

14. The network device according to claim 9, wherein,
the packet reassembly database comprises a Source Descriptor Memory (SDM) and a Source Queue Memory (SQM), wherein the SDM is configured to store source descriptors and take the packet Class of Service (CoS) and the SID as the index, while the SQM is configured to store source queues corresponding to the source descriptors; the SQM comprises a pointer that points to a Reorder-Packet-Array-Buffer, which stores the packet descriptors of the cells waiting to be ordered, each of the packet descriptors pointing to a cell descriptor of a latest received cell belonging to the packet.

15. The network device according to claim 14, wherein,
the Reorder-Packet-Array-Buffer is a dynamic packet descriptor array, comprising a positive integer number classes of memory blocks of different capacities.

16. The network device according to claim 9, wherein,
the packet reassembly database comprises a Multicast Group ID (MGID) descriptor memory and a MGID queue memory, wherein the MGID descriptor memory is configured to store MGID descriptors and take the CoS of a packet, the MGID and a source port number as the index, while the MGID queue memory is configured to store MGID queues corresponding to the MGID descriptors; the MGID queue memory comprises a pointer that points to a Reorder-Packet-Array-Buffer, which stores the packet descriptors of the cells waiting to be ordered, each of the packet descriptors pointing to a cell descriptor of a latest received cell belonging to the packet.

17. A communication system, comprising the network device according to claim 9 and a source port device;
the source port device is configured to send a cell to the network device, wherein the cell carries a Source Identification (SID), a packet sequence number and a cell sequence number.

\* \* \* \* \*